United States Patent
Sinha (10) Patent No.: US 8,127,010 B2
(45) Date of Patent: Feb. 28, 2012

(54) SYSTEM AND METHOD FOR ADAPTIVE ALLOCATION OF THREADS TO USER OBJECTS IN A COMPUTER SYSTEM

(75) Inventor: Anand Sinha, Hamilton (CA)

(73) Assignee: Research In Motion Limited, Waterloo (CA)

( * ) Notice: Subject to any disclaimer, the term of this patent is extended or adjusted under 35 U.S.C. 154(b) by 1076 days.

(21) Appl. No.: 11/240,205

(22) Filed: Sep. 30, 2005

(65) Prior Publication Data

US 2006/0075406 A1    Apr. 6, 2006

Related U.S. Application Data

(60) Provisional application No. 60/616,067, filed on Oct. 4, 2004.

(51) Int. Cl.
*G06F 15/173* (2006.01)

(52) U.S. Cl. ......... 709/226; 709/223; 709/224; 714/39

(58) Field of Classification Search ............ 709/223, 709/224, 226
See application file for complete search history.

(56) References Cited

U.S. PATENT DOCUMENTS

| | | | |
|---|---|---|---|
| 5,857,191 A | 1/1999 | Blackwell et al. | |
| 5,991,792 A * | 11/1999 | Nageswaran | 718/102 |
| 6,105,067 A | 8/2000 | Batra | |
| 6,112,196 A | 8/2000 | Zimowski | |
| 6,125,382 A | 9/2000 | Brobst et al. | |
| 6,219,694 B1 * | 4/2001 | Lazaridis et al. | 709/206 |
| 6,237,024 B1 * | 5/2001 | Wollrath et al. | 709/203 |
| 6,324,492 B1 | 11/2001 | Rowe | |
| 6,477,561 B1 * | 11/2002 | Robsman | 718/105 |
| 6,542,920 B1 | 4/2003 | Belkin et al. | |
| 6,609,159 B1 | 8/2003 | Dukach | |
| 6,704,737 B1 | 3/2004 | Nixon et al. | |
| 6,766,349 B1 | 7/2004 | Belkin | |
| 6,782,410 B1 * | 8/2004 | Bhagat et al. | 709/201 |
| 6,920,634 B1 | 7/2005 | Tudor | |
| 6,968,557 B1 | 11/2005 | Zhang | |
| 7,352,731 B1 | 4/2008 | Leung | |
| 7,406,692 B2 | 7/2008 | Halpern | |

(Continued)

FOREIGN PATENT DOCUMENTS

WO    91 20033    12/1991

(Continued)

OTHER PUBLICATIONS

Moore, ("Tuning Internet Information Server Performance", Microsoft TechNet, Dec. 1997, pp. 1-2).*

(Continued)

*Primary Examiner* — Jude Jean Gilles
*Assistant Examiner* — Jaren M Means
(74) *Attorney, Agent, or Firm* — The Danamraj Law Group, P.C.

(57) ABSTRACT

A method for optimizing enterprise server resources in a computer system is described. The method comprises monitoring at least one metric of the computer system capable of indicating a performance level thereof; determining whether the performance level needs to be improved; and responsive to a determination that the performance level needs to be improved, implementing a best method to improve the performance level by adaptively manipulating one or more threads in a pool of threads in the computer system.

17 Claims, 4 Drawing Sheets

U.S. PATENT DOCUMENTS

| | | | | |
|---|---|---|---|---|
| 2002/0087913 | A1* | 7/2002 | Harper et al. | 714/15 |
| 2002/0194377 | A1* | 12/2002 | Doolittle et al. | 709/246 |
| 2003/0081621 | A1* | 5/2003 | Godfrey et al. | 370/400 |
| 2003/0126184 | A1* | 7/2003 | Austin | 709/105 |
| 2003/0217087 | A1* | 11/2003 | Chase et al. | 709/1 |
| 2004/0139434 | A1* | 7/2004 | Blythe et al. | 718/100 |
| 2004/0167959 | A1* | 8/2004 | Doyle et al. | 709/203 |
| 2006/0075405 | A1 | 4/2006 | Sinha | |
| 2006/0117318 | A1* | 6/2006 | Rumelhart et al. | 718/104 |

FOREIGN PATENT DOCUMENTS

| | | |
|---|---|---|
| WO | 00 45286 | 8/2000 |
| WO | 01 22215 | 3/2001 |
| WO | 01 76120 | 12/2001 |
| WO | 03 003256 | 1/2003 |

OTHER PUBLICATIONS

Reilly G., ("The Art and Science of Web Server Tuning with Internet Information Services 5.0", Microsoft White Papers, Mar. 2001, pp. 1-39, retrieved from http://as.ur.ucdavis.edu/netops/TechSupport/Server%20Support/Web%20Server%20Tuning%20with%20IIS5.pdf).*

Xu D., ("Performance Study and Dynamic Optimization Design for Thread Pool Systems", Aug. 2004, pp. 1-6).*

International Search Report; Patent Cooperation Treaty; Jan. 10, 2006; 8 pages.

EPO Examination Report in EP Application No. 05791277.6 European Patent Office; Feb. 20, 2009; 5 pages.

Canadian Office Action; Application No. 2,577,221; Canadian Intellectual Property Office; Feb. 15, 2010, 3 pages.

CA Office Action, Application No. 2,577,221, Canadian IPO, Dec. 20, 2010, 3 pgs.

CA Office Action, Application No. 2,577,230, Canadian IPO, Dec. 9, 2008, 3 pgs.

CA Office Action, Application No. 2,577,230, Canadian IPO, Jan. 26, 2011, 3 pgs.

EP Communication Examination Report, Application No. 05791277.6, European Patent Office, Apr. 28, 2008, 1 pg.

EP Communication Examination Report, Application No. 05791409.5, European Patent Office, Apr. 2, 2008, 1 pg.

EP Communication Examination Report, Application No. 05791409.5, European Patent Office, Sep. 15, 2009, 5 pgs.

EP Search Report; Application No. 05791409.5, European Patent Office, Jan. 15, 2008, 11 pgs.

PCT Search Report, Application No. PCT/CA2005/001502, European Patent Office, Jan. 11, 2006, 9 pgs.

PCT International Preliminary Report and Written Opinion, Application No. PCT/CA2005/001503, Apr. 19, 2007, 14 pgs.

US Office Action, U.S. Appl. No. 11/240,204, USPTO, Jan. 26, 2010, 15 pgs.

US Office Action, U.S. Appl. No. 11/240,204, USPTO, Jul. 6, 2010, 14 pgs.

US Office Action, U.S. Appl. No. 11/240,204, USPTO, Sep. 16, 2010, 14 pgs.

US Office Action, U.S. Appl. No. 11/240,204, USPTO, Feb. 10, 2011, 16 pgs.

Box, Don, "Q&A House of COM," Microsoft Systems Communications, Sep. 1998, 8 pgs.

Hadharan, R., et al., "End to end performance modeling of web server architectures,", ACM SIGMETRICS Performance Evaluation Review, vol. 28, Issue 2 (Sep. 2000), pp. 57-63.

Lee, et al, "Using threading and factory model to improve the performance of distributed object computing system," Telecommunication Laboratory, 2001 IEEE, pp. 371-376.

van der Mei, R.D., et al, "A decision support system for tuning Web servers in distributed object oriented network architecture," ACM SIGNETRICS Performance Evaluation Review, vol. 27, Issue 4 (Mar. 2000), pp. 57-62.

European Search Report; European Patent Office; Jan. 11, 2008; 9 pages.

Brown; "FastCGI Understanding FastCGI Application Performance"; Open Market, Inc.; Jun. 10, 1996; pp. 1-5.

Moore; "Tuning Internet Information Server Performance"; Microsoft TechNet; Dec. 16, 1997; 2 pages.

* cited by examiner

SYSTEM AND METHOD FOR ADAPTIVE ALLOCATION OF THREADS TO USER OBJECTS IN A COMPUTER SYSTEM

PRIORITY UNDER 35 U.S.C. §119(e) & 37 C.F.R. §1.78

This nonprovisional application claims priority based upon the following prior United States provisional patent application entitled: "ADAPTIVE THREADING," Application No. 60/616,067, filed Oct. 4, 2004, in the name(s) of Anand Sinha, which is hereby incorporated by reference.

CROSS-REFERENCE TO RELATED APPLICATION(S)

This application is related to U.S. patent application Ser. No. 11/240,204, filed Sep. 30, 2005, now published as U.S. Patent Application Publication No. 20060075405, which is hereby incorporated by reference in its entirety.

TECHNICAL FIELD

The present disclosure relates, in general, to computer systems and, in particular, to a system and method for adaptive allocation of threads to user objects in such computer systems.

BACKGROUND

Threads are instances of software processes operating on a computer system. In operation, when a first user object has a task that needs to be performed, a master thread associates an available worker thread with the user object. Once the task has been completed, the first user object is placed in a wait state until it has another task to be performed and the worker thread is returned to a thread pool to be associated with another user having a task to be performed. When the first user object has another task to be performed, it is likely that a different thread will be assigned thereto to perform that task. A problem exists in that a thread can get "hung" or "hung up". This can occur for many reasons. One reason is that there is contention for system resources such as memory resources, processor resources, and network resources. For example, assuming a first thread locks a resource, when a second thread needs to use the same resource, the second thread will wait for the first thread to release, or unlock, the resource. If the first thread crashes or is for some other reason unable to unlock the resource, the second thread will get hung.

Additionally, a thread could get hung due to an error in a communications subsystem, such as a mail application programming interface ("API"). When a thread makes a call to the subsystem, the thread is locked in and at the mercy of that subsystem. If there is a crash in the subsystem, the thread will be hung. The same scenario also applies on the case of operating systems. It is also possible that the subsystem could get hung itself, which would hang the calling thread.

Finally, a thread could get hung as a result of a network request taking an excessively long time to complete, due to poor network conditions or hardware issues (such as domain controllers being down, routers/repeaters being down), for example. In this scenario, the thread gets hung waiting for the network to return.

Hang up conditions waste valuable processing time and create undesirable overhead as a result of the need to track and monitor the threads that are hung. For the foregoing and other reasons, there exists a need to optimize thread processing so as to diminish the likelihood of a thread getting hung.

BRIEF DESCRIPTION OF THE DRAWINGS

For a more complete understanding of the features and advantages of the present method and mobile device, reference is now made to the detailed description along with the accompanying figures in which corresponding numerals in the different figures refer to corresponding parts and in which.

DETAILED DESCRIPTION OF THE PREFERRED EMBODIMENTS

Method and system described herein provide effective thread processing in an enterprise server system environment via adaptive threading (i.e., manipulation of threads in a pool of threads based on certain performance criteria or conditions), which will be described below in an exemplary context of data item redirection as may be employed in a mobile communications environment. The enterprise server associates threads for each user. A user object (e.g., a user name) describes the user. Adaptive threading is based on the ability of a master thread to continually obtain metrics for the operation of the system. Initially, the enterprise server system runs with a single thread pool, which can service the user objects properly, such that the number of unassigned threads is minimized or eliminated. If the system begins to perform poorly, the master thread determines the best method of assigning or creating threads to increase performance. Adaptive threading ensures that processing resources in the enterprise server environment are efficiently utilized.

As indicated above, as the system becomes loaded, the master thread obtains various metrics including, but not limited to, those related to mail delivery latency, CPU utilization per thread, overall CPU utilization, thread wait counts (which are a measure of the amount of time a thread spends waiting for outside processes to be performed, during which that thread is locked up and effectively removed from the pool), memory usage, peak memory usage, disk I/O, and any other metric that could be used to evaluate system performance.

The various metrics are maintained and tracked over a period of time (e.g., hours or days). Moving average, mean, and standard deviation are calculated and used to determine whether the performance of the system has been degraded to an unacceptable level. If so, a determination is made as to the best method to improve performance. For example, to combat increased mail delivery latency, which indicates that work is being added to the system faster than the system can process it, the best method may be to increase the number of worker threads in the system. The work is spread out over all of the users in a shotgun-spread fashion. By increasing the worker threads, more threads are available to work on the queued up requests.

On the other hand, this would not necessarily be the best course of action if, for example, the increased mail delivery latency were due to faulty network connection. This situation would be evidenced by increased mail latency for some, but not all, users, and higher than expected wait counts while the thread worked on that same set of users. The best method to combat this situation could be to create a new thread pool and to move the affected users to the new thread pool.

In a case in which poor system performance is due to fail over of the mail file and the resulting longer-than-expected access time to native databases, a thread affinity redistribution of users may have to occur. It is also possible that some of the metrics may point to other system deficiencies, such as low disk space resulting in problems with swapping memory. Low disk space could also result in insufficient temporary disk storage for other enterprise server operations. The enterprise server could then reduce the number of threads to allow for reduced use of the low disk space. This would likely result in high latency, so the algorithms would have to work together to prevent a thrashing situation.

The basic function of the adaptive threading is to detect trends in performance to attempt to predict an impending degradation in performance situation and to take steps to prevent this situation from being noticed by the system administrators.

As used in this application, the term "host system" refers to a computer system on which software for redirecting user data items to a user's MDCD ("redirector software") is operating. In one embodiment, the host system is a user's PC; in an alternative embodiment, the host system is a network server connected to a user's PC via a local-area network ("LAN"). In yet another alternative embodiment, the host system could be any other system that is in communication with a user's PC.

Instead of warehousing (or storing) a user's data items at the host system and then "synchronizing" the user's MDCD to data items stored at the host system when the mobile device requests that such items of information be communicated to it, the exemplary application of the present disclosure employs a "push" paradigm that continuously packages and retransmits the user's data items to the MDCD in response to a triggering event detected at the host system. Wireless MDCDs, especially those that can return a confirmation signal to the host that the pushed data has been received, are especially well-suited for this type of push paradigm. Due to bandwidth limitations of wireless networks, redirection of only a portion of a data item may be desirable, with the user given the option of then retrieving the entire data item (or some other portion of the data item) from the host system.

An embodiment of an enterprise server may include a redirection system or redirector software operating at the host system that enables the user to cause certain user-selected data items (or parts of data items) to be redirected or mirrored from the host system to the user's MDCD upon detecting that one or more user-defined triggering events has occurred. Also operating at the host system are various subsystems that may be configured to create triggering events, such as a screen saver subsystem or a keyboard subsystem, as well as subsystems for repackaging the user's data items for transparent delivery to the MDCD, such as a Transmission Control Protocol/Internet Protocol ("TCP/IP") subsystem or one or more E-Mail subsystems. Other subsystems for creating triggering events and repackaging the user's data items could also be present at the host system. The host system also includes a primary memory store where the user's data items are normally stored.

Using the redirector software of an enterprise server, the user can select certain data items for redirection, such as E-mail messages, calendar events, meeting notifications, address entries, journal entries, personal reminders, and others. Having selected the data items to be redirected, the user can then configure one or more event triggers to be sensed by the redirector software to initiate redirection of the selected data items. These user-defined event triggers include external events, internal events, and networked events.

Examples of external events include receiving a message from the user's MDCD to begin redirection, receiving a similar message from some external computer, sensing that the user is no longer in the vicinity of the host system, or any other event that is external to the host system. Examples of internal events include a calendar alarm, screen saver activation, a keyboard timeout, timeout of a programmable timer, or any other event that is internal to the host system. Networked events are user-defined messages that are transmitted to the host system from another computer coupled to the host system via a network to initiate redirection. These are just some of the examples of the types of user-defined events that can trigger the redirector software to push data items from the host system to the MDCD. Although in a particular embodiment it is anticipated that the configuration that specifies which data items will be redirected and in what form will be set or modified at the host system, it is within the scope of this disclosure that such configuration may be set or modified through data sent from the MDCD.

In addition to the functionality noted above, the redirector software may provide a set of possibly software-implemented control functions for determining the type of MDCD and its address, for programming a preferred list of message types that are to be redirected, and for determining whether the MDCD can receive and process certain types of message attachments, such as word processor or voice attachments. The determination of whether a particular MDCD can receive and process attachments is initially configured by the user of that MDCD at the host system. This configuration can be altered on a global or per-message basis by transmitting a command message from the MDCD to the host system. If the redirector software is configured so that the MDCD cannot receive and process word processor or voice attachments, then the redirector software will route such attachments to an external machine that is compatible with the particular attachment, such as an attached printer or networked fax machine or telephone.

Other types of attachments could be redirected to other types of external machines in a similar fashion, depending upon the capabilities of the MDCD. For example, if a user is traveling and receives a message with an attachment that the user's MDCD cannot process or display, the user may send a command message from the MDCD to the host system indicating that the attachment is to be sent to a fax machine at a hotel where the user will be spending the evening. This enables the user to receive important E-mail attachments as long as the host system is provided with sufficient information about the destination to which the attachment is to be forwarded.

Once an event has triggered redirection of one or more of a user's data items, the host system may then repackage these items in a manner that is transparent to the MDCD, so that information on the MDCD appears similar to information on the user's host system. One repackaging method includes wrapping the user data items in an E-mail envelope that corresponds to the address of the MDCD, although, alternatively, other repackaging methods could be used with the present disclosure, such as special-purpose TCP/IP wrapping techniques, or other methods of wrapping the data items. The repackaging preferably results in E-mail messages generated by the user from the mobile device to be transmitted from the host system, thus enabling the user to appear to have a single E-mail address, such that the recipients of messages sent from the mobile communications device do not know where the user was physically located when the message was first sent. The repackaging also permits both messages sent to the MDCD and messages sent from the MDCD to be encrypted and decrypted, as well as compressed and decompressed.

In an alternative system and method, the redirector software executes on a network server, and the server is programmed to detect numerous redirection event triggers over the network from multiple user desktop computers coupled to the server via a LAN. The server can receive internal event triggers from each of the user desktops via the network, and can also receive external event triggers, such as messages from the users' MDCDs. In response to receiving one of these triggers, the server redirects the user's data items to the proper MDCD. The user data items and addressing information for a particular mobile device can be stored at the server or at the user's PC. Using this alternative configuration, one redirector software can serve a plurality of users. This alternative configuration could also include an internet- or intranet-based redirector software that could be accessible through a secure web page or other user interface. The redirector software could be located on an Internet Service Provider's system and accessible only through the Internet.

In another alternative configuration of the exemplary application of the present disclosure, a redirector software operates at both the host system and at the user's MDCD. In this configuration, the user's mobile device operates similarly to the host system described below, and is configured in a similar fashion to push certain user-selected data items from the mobile device to the user's host system (or some other computer) upon detecting an event trigger at the mobile device. This configuration provides two-way pushing of information from the host to the mobile device and from the mobile device to the host.

Figure 1:
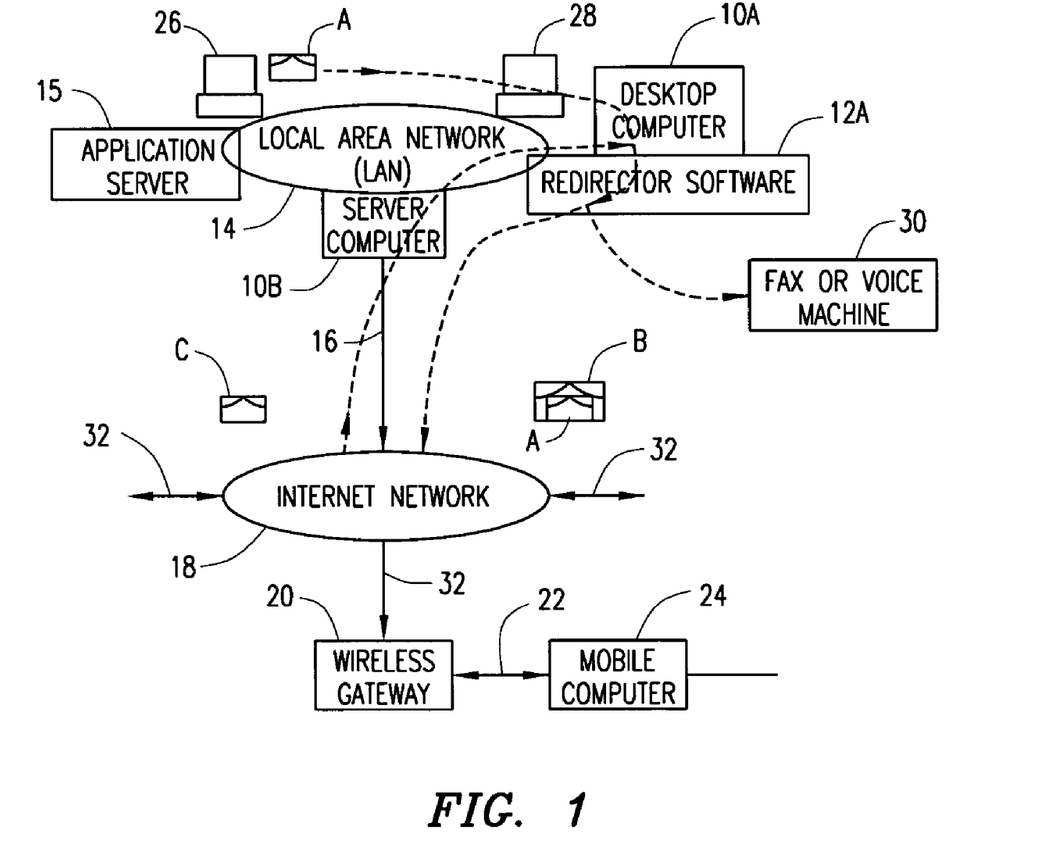
FIG. 1 is a system diagram depicting redirection of user data items from a host system comprising a user's PC to the user's mobile data communication device ("MDCD"), wherein redirector software is operating at the user's PC.

Referring now to the drawings, FIG. 1 is an example system diagram showing the redirection of user data items (such as message A or C) from a user's office PC (host system) 10A to the user's MDCD 24, where the redirector software 12A is operating at the user's PC. Message A in FIG. 1 represents an internal message sent from desktop 26 to the user's host system 10A via enterprise network 14. Message C in FIG. 1 represents an external message from a sender that is not directly connected to the enterprise network 14, such as the user's MDCD 24, some other user's mobile device (not shown), or any user connected to the Internet 18. Message C also represents a command message from the user's MDCD 24 to the host system 10A. The host system 10 preferably includes, along with the typical hardware and software associated with a workstation or desktop computer, the redirector software 12A, a TCP/IP subsystem 42, a primary message store 40, an E-mail subsystem 44, a screen saver subsystem 48, and a keyboard subsystem 46.

In FIG. 1, the host system 10A is the user's desktop system, typically located in the user's office. The host system 10A is connected to an enterprise network 14, which may be a packet-switched network and which can include one or more geographic sites and, in the illustrated embodiment, is organized as a local area network ("LAN"), for serving a plurality of corporate users. A number of application servers, represented in FIG. 1 by an application server 15, disposed as part of the enterprise network 14 are operable to provide or effectuate a host of internal and external services such as email, video mail, Internet access, corporate data access, messaging, calendaring and scheduling, information management, and the like. Accordingly, a diverse array of personal information appliances such as desktop computers, laptop computers, palmtop computers, et cetera, collectively represented in FIG. 1 by desktop computers 26 and 28, may be operably networked to one or more of the application servers 15 with respect to the services supported in the enterprise network 14.

Additionally, a remote services server 10B may be interfaced with the enterprise network 14 for enabling a corporate user to access or effectuate any of the services from a remote location via the MDCD 24.

The enterprise network 14 is connected to a wide area network ("WAN") 18, preferably the Internet, which is defined by the use of TCP/IP to exchange information, but which, alternatively could be any other type of WAN. The connection of the enterprise network 14 to the WAN 18 is via high bandwidth link 16, typically a T1 or T3 connection. The WAN 18 in turn is connected to a variety of gateways 20, via connections 32. A gateway forms a connection or bridge between the WAN 18 and some other type of network, such as an RF wireless network, cellular network, satellite network, or other synchronous or asynchronous land-line connection.

In the example of FIG. 1, a wireless gateway 20 is connected to the Internet for communicating via wireless link 22 to a plurality of wireless MDCDs 24. Also shown in FIG. 1 is machine 30, which could be a FAX machine, a printer, a system for displaying images (such as video) or a machine capable of processing and playing audio files, such as a voice mail system. The present disclosure includes the ability to redirect certain message attachments to such an external machine 30 if the redirector software configuration data reflects that the MDCD 24 cannot receive and process the attachments, or if the user has specified that certain attachments are not to be forwarded to MDCD 24, even if such device can process those attachments. By way of example, consider an E-mail sent to a user that includes three attachments—a word processing document, a video clip and an audio clip. The redirector software could be configured to send the text of the E-mail to the remote device, to send the word processing document to a networked printer located near the user, to send the video clip to a store accessible through a secure connection through the internet and to send the audio clip to the user's voice mail system. This example is not intended to limit the breadth and scope of the disclosure, but rather to illustrate the variety of possibilities embodied in the redirection concept.

The MDCD 24 may be a hand-held two-way wireless paging computer, a wirelessly enabled palm-top computer, a mobile telephone with data messaging capabilities, or a wirelessly enabled laptop computer, but could, alternatively be other types of MDCDs capable of sending and receiving messages via a network connection 22. Although the system may operate in a two-way communications mode, certain aspects of the disclosure could be beneficially used in a "one and one-half" or acknowledgment paging environment, or even with a one-way paging system. The MDCD 24 may be configured, for example via software program instructions, to work in conjunction with the redirector software 12A to enable the seamless, transparent redirection of user-selected data items.

In an alternative embodiment of the present disclosure, not explicitly shown in the drawings, the MDCD 24 also includes redirector software. In this embodiment, user selected data items can be replicated from the host to the mobile device and vice versa. The configuration and operation of the MDCD 24 having redirector software is similar to that described herein with respect to FIGS. 1-2.

A user of the present disclosure can configure the redirector software 12A to push certain user-selected data items to the user's MDCD 24 when the redirector 12A detects that a particular user-defined event trigger (or trigger point) has taken place. User-selected data items preferably include E-mail messages, calendar events, meeting notifications, address entries, journal entries, personal alerts, alarms, warnings, stock quotes, news bulletins, etc., but could, alternatively, include any other type of message that is transmitted to the host system 10A, or that the host system 10A acquires through the use of intelligent agents, such as data that is received after the host system 10A initiates a search of a database or a website or a bulletin board. In some instances, only a portion of the data item is transmitted to the MDCD 24 in order to minimize the amount of data transmitted via the wireless network 22. In these instances, the MDCD 24 can optionally send a command message to the host system to receive more or all of the data item if the user desires to receive it.

Among the user-defined event triggers that can be detected by the redirector software 12A are in the preferred embodiment external events, internal events and networked events. External events preferably include: (1) receiving a command message (such as message C) from the user's MDCD to begin redirection, or to execute some other command at the host, such as a command to enable the preferred list mode, or to add or subtract a particular sender from the preferred list; (2) receiving a similar message from some external computer; and (3) sensing that the user is no longer in the vicinity of the host system; although, alternatively, an external event can be any other detectable occurrence that is external to the host system. Internal events could be a calendar alarm, screen saver activation, keyboard timeout, programmable timer, or any other user-defined event that is internal to the host system. Networked events are user-defined messages that are transmitted to the host system from another computer coupled to the host system via a network to initiate redirection. These are just some of the events that could be used with the present disclosure to initiate replication of the user-selected data items from the host system 10 to the MDCD 24.

FIG. 1 shows an E-mail message A being communicated over enterprise network 14 from computer 26 to the user's desktop system 10A (also shown in FIG. 1 is an external message C, which could be an E-mail message from an Internet user, or could be a command message from the user's MDCD 24). Once the message A (or C) reaches the primary message store of the host system 10A, it can be detected and acted upon by the redirector software 12A. The redirector software 12A can use many methods of detecting new messages.

Assuming that the redirector software 12A is activated, and has been configured by the user (either through the sensing of an internal, network or external event) to replicate certain user data items (including messages of type A or C) to the MDCD 24, when the message A is received at the host system 10A, the redirector software 12A detects its presence and prepares the message for redirection to the MDCD 24. In preparing the message for redirection, the redirector software 12A could compress the original message A, could compress the message header, or could encrypt the entire message A to create a secure link to the MDCD 24.

Also programmed into the redirector software 12A is the address of the user's MDCD 24, the type of device, and whether the device 24 can accept certain types of attachments, such as word processing or voice attachments. If the user's type of mobile device cannot accept these types of attachments, then the redirector software 12A can be programmed to route the attachments to a fax or voice number where the user is located using an attached fax or voice machine 30.

The redirector software 12A may also be programmed with a preferred list mode that is configured by the user either at the host system 10A, or remotely from the user's MDCD by transmitting a command message C. The preferred list contains a list of senders (other users) whose messages are to be redirected or a list of message characteristics that determine whether a message is to be redirected. If activated, the preferred list mode causes the redirector software 12A to operate like a filter, only redirecting certain user data items based on whether the data item was sent from a sender on the preferred list or has certain message characteristics that if present will trigger or suppress redirection of the message. In the example of FIG. 1, if desktop computer 26 was operated by a user on the preferred list of host system 10A, and the preferred list option was activated, then message A would be redirected. If, however, desktop computer 26 was operated by a user not on the host system 10A's preferred list, then message A would not be redirected, even if the user of the host system 10A had configured the redirector to push messages of type A. The user of the host system 10A can configure the preferred list directly from the desktop system, or, alternatively, the user can then send a command message (such as C) from the MDCD 24 to the host system 10A to activate the preferred list mode, or to add or delete certain senders or message characteristics from the preferred list that was previously configured it should be appreciated that a redirector program 12A could combine message characteristics and preferred sender lists to result in a more finely-tuned filter. Messages marked as low priority or that are simple return receipts or message read receipts, for example, could always be suppressed from redirection while messages from a particular sender would always be redirected.

After the redirector software 12A has determined that a particular message should be redirected, and it has prepared the message for redirection, the software 12A then sends the message A to a secondary memory store located in the MDCD 24, using whatever means are necessary. In the preferred embodiment this method is to send the message A back over the enterprise network 14, WAN 18, and through the wireless gateway 20 to the MDCD 24. In doing so, the redirector preferably repackages message A as an E-mail with an outer envelope B that contains the addressing information of the MDCD 24, although alternative repackaging techniques and protocols could be used, such as a TCP/IP repackaging and delivery method (most commonly used in the alternative server configuration shown in FIG. 2). The wireless gateway 20 requires this outer envelope information B in order to know where to send the redirected message A. Once the message (A in B) is received by the MDCD 24, the outer envelope B is removed and the original message A is placed in the secondary memory store within the MDCD 24. By repackaging and removing the outer envelope in this manner, the present disclosure causes the MDCD 24 to appear to be at the same physical location as the host system 10A, thus creating a transparent system.

In the case where message C is representative of an external message from a computer on the Internet 18 to the host system 10A, and the host system 10A has been configured to redirect messages of type C, then in a similar manner to message A, message C would be repackaged with an outer envelope B and transmitted to the user's MDCD 24. In the case where message C is representative of a command message from the user's MDCD 24 to the host system 10A, the command message C is not redirected, but is acted upon by the host system 10A.

If the redirected user data item is an E-mail message, as described above, the user at the MDCD 24 sees the original subject, sender's address, destination address, carbon copy and blind carbon copy. When the user replies to this message, or when the user authors a new message, the software operating at the MDCD 24 adds a similar outer envelope to the reply message (or the new message) to cause the message to be routed first to the user's host system 10A, which then removes the outer envelope and redirects the message to the final destination, such as back to computer 26. In the preferred embodiment, this results in the outgoing redirected message from the user's host system 10A being sent using the E-mail address of the host mailbox, rather than the address of the mobile device, so that it appears to the recipient of the message that the message originated from the user's desktop system 10A rather than the MDCD 24. Any replies to the redirected message will then be sent to the host system 10A, which if it is still in redirector mode, will repackage the reply and resend it to the user's mobile data device, as described above.

Figure 2:
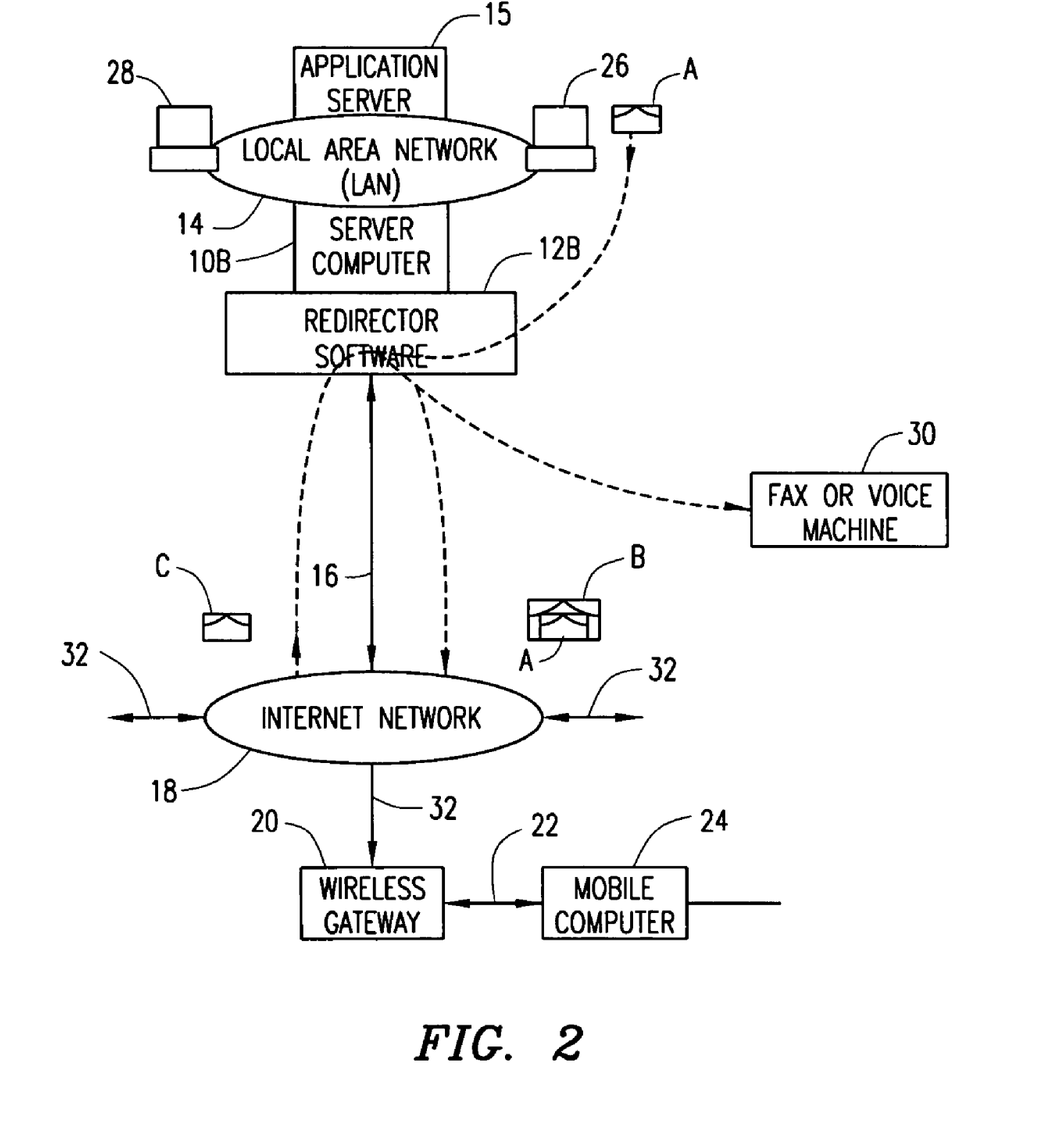
FIG. 2 is a system diagram depicting redirection of user data items from host system comprising a network server to a user's MDCD, wherein redirector software is operating at the server.

FIG. 2 is an alternative system diagram showing the redirection of user data items from the remote services server 10B to the user's MDCD 24, where the redirector software 12B is operating at the server 10B. This configuration is particularly advantageous for use with message servers, which are normally operated so that all user messages are stored in one central location or mailbox store on the server instead of in a store within each user's desktop PC. This configuration has the additional advantage of allowing a single system administrator to configure and keep track of all users having messages redirected. If the system includes encryption keys, these too can be kept at one place for management and update purposes.

In this alternative configuration, server 10B preferably maintains a user profile for each user's desktop system 26, 28, including information such as whether a particular user can have data items redirected, which types of message and information to redirect, what events will trigger redirection, the address of the users' MDCD 24, the type of mobile device, and the user's preferred list, if any. The event triggers are preferably detected at the user's desktop system 26, 28, and can be any of the external, internal or network events listed above. The desktop systems 26, 28, preferably detect these events and then transmit a message to the server computer 10B via enterprise network 14 to initiate redirection. Although the user data items are preferably stored at the server computer 10B in this embodiment, they could, also or alternatively, be stored at each user's desktop system 26, 28, which would then transmit them to the server computer 10B after an event has triggered redirection.

As shown in FIG. 2, desktop system 26 generates a message A that is transmitted to and stored at the host system 10B, which is the network server operating the redirector software 12B. The message A is for desktop system 28, but in this embodiment, user messages are stored at the network server 10B. When an event occurs at desktop system 28, an event trigger is generated and transmitted to the network server 10B, which then determines who the trigger is from, whether that desktop has redirection capabilities, and if so, the server (operating the redirector software) uses the stored configuration information to redirect message A to the mobile computer 24 associated with the user of desktop system 28.

Additional details regarding the exemplary redirection system may be found in U.S. Pat. No. 6,219,694 to Lazaridis et al., which is hereby incorporated by reference herein.

As previously noted, threads are instances of software processes, such as the redirector software 12A, 12B, that operate on a computer system. In particular, as used herein, the term "threads" refers to instances of software processes that operate on the business enterprise server.

Figure 3:
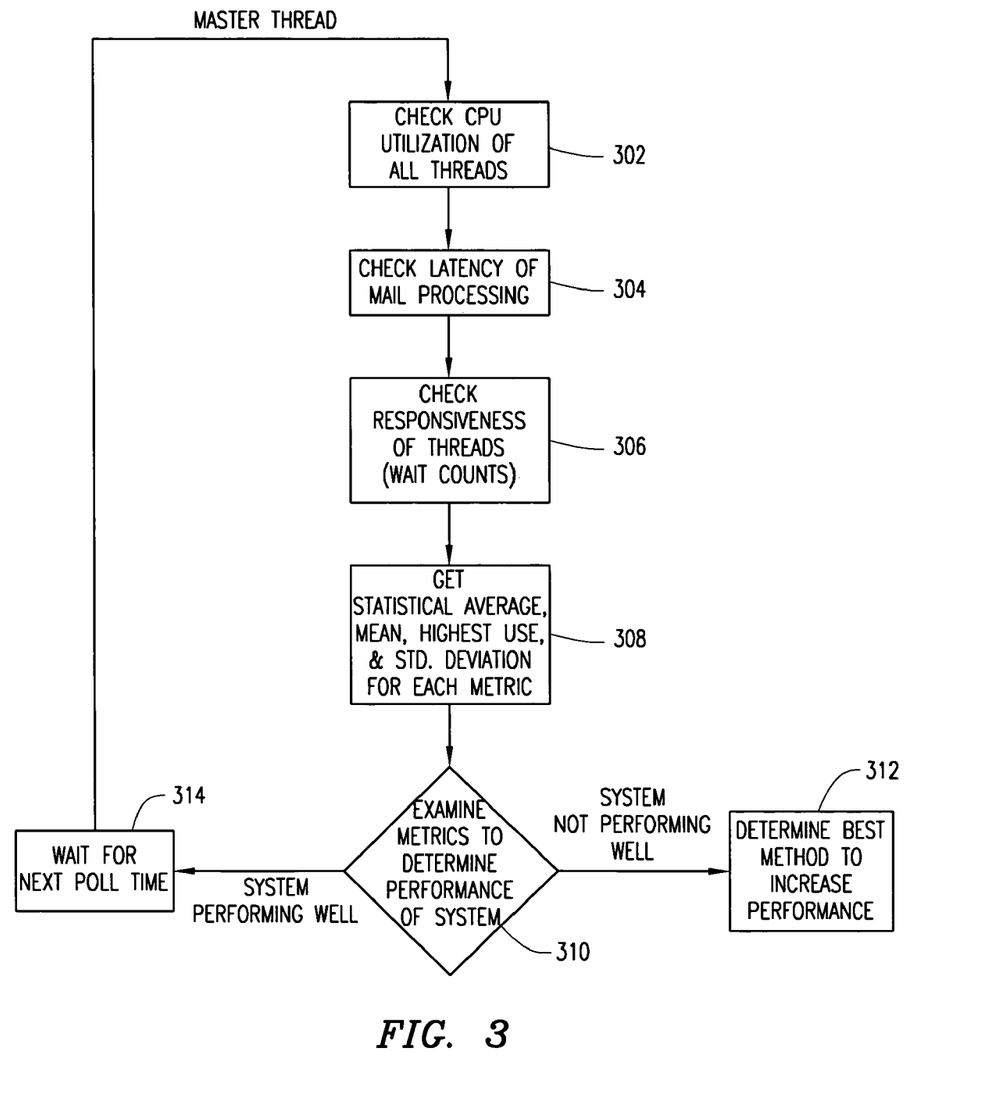
FIG. 3 is a flowchart depicting a method of increasing thread processing performance in accordance with one embodiment.

FIG. 3 depicts a flowchart of a method for increasing thread processing performance in accordance with one embodiment. In general, this method includes monitoring at least one metric of the computer system capable of indicating a performance level thereof, determining whether the performance level needs to be improved, and, responsive to a determination that the performance level needs to be improved, selecting and implementing a best method to improve the performance level by adaptively manipulating one or more threads in a pool of threads in the computer system.

More particularly, referring to FIG. 3, first, the CPU utilization of all threads is checked (block 302). The CPU utilization of threads may be monitored by hardware, software, or a combination of hardware and software. A software module may be used to monitor the amount of time that has transpired for a thread and the amount of activity that has occurred such as by checking latency of the mail processing (block 304). Other characteristics of the process may include checking responsiveness of the threads (wait counts) (block 306). Other metrics, such as those listed above, may be checked as well, although not explicitly shown in FIG. 3. Various calculations may be made on the collected data, such as determining statistical average, mean, highest use value, and standard deviation, etc., for each metric (block 308). The metrics are then examined and a determination is made as to the performance of the system (block 310). If the system is not performing well, the best method to increase performance is determined (block 312). If the system is performing well, the system waits for the next poll time (block 314) and the process is repeated.

Figure 4:
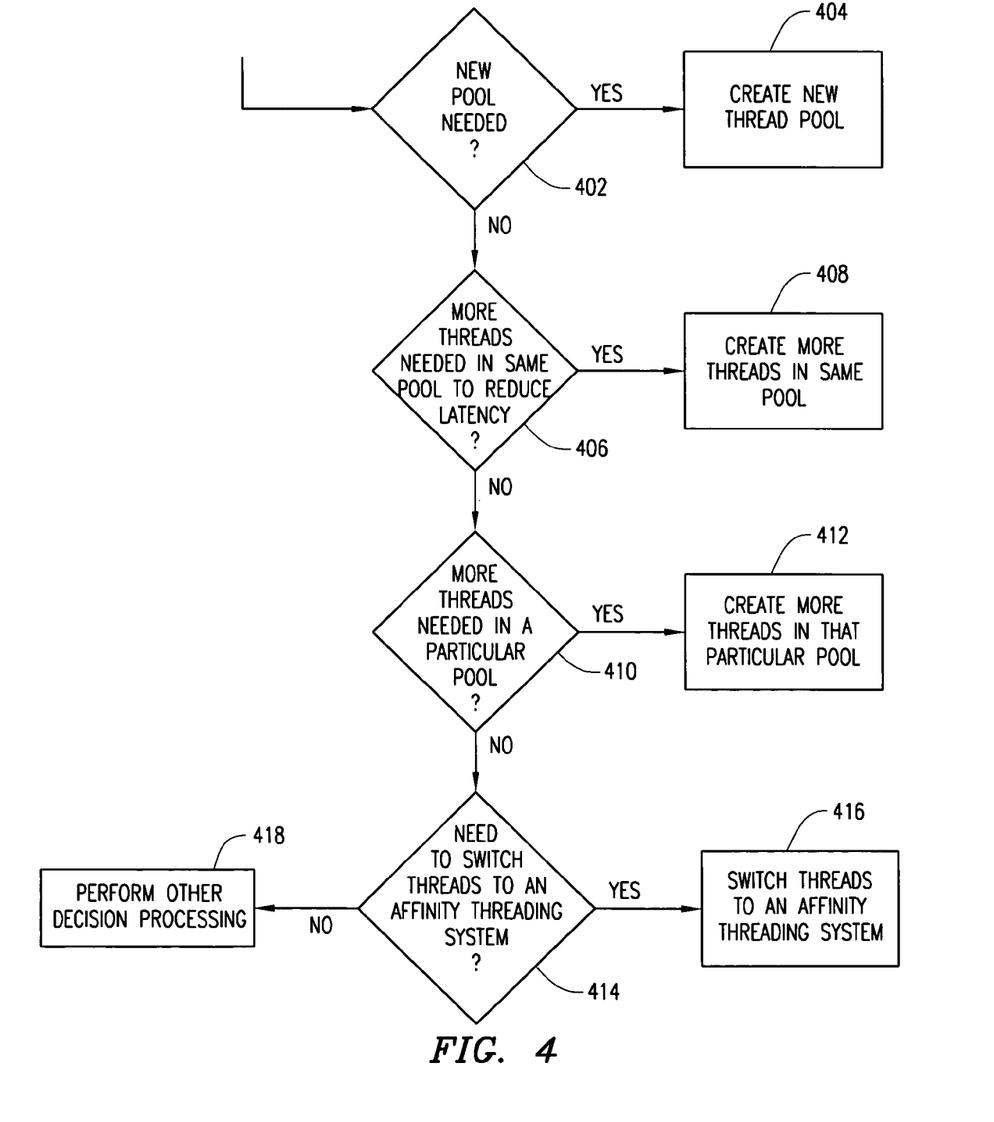
FIG. 4 is a flowchart depicting a method of determining the best method to increase performance in accordance with an embodiment.

FIG. 4 depicts a flowchart of a method for determining the best method to increase performance in accordance with an embodiment. First, a determination is made as to whether a new thread pool is to be created (block 402). If so, a new thread pool is created and users are assigned to threads of the new thread pool so as to isolate those users from affecting other users (block 404). If a new thread pool is not to be created, a determination is made as to whether more threads in the same pool need to be created to reduce latency (block 406). If so, new threads are be created in the same pool to reduce latency (block 408). Otherwise, a determination is made as to whether to create more threads in a particular pool if already multi-pooled (block 410). If so, more threads are created in the identified pool (block 412); otherwise, a determination is made as to whether to switch threads to an affinity threading system (block 414). If so, threads are switched to an affinity threading system (block 416), such as that described in U.S. Patent Application Publication No. 2006/0075405. As described therein, in an affinity threading system, threads are permanently assigned to and associated with a user object, i.e., the assignment of a thread to a user object remains in place except in special circumstances, such as when the system is being shut down or threads are being reallocated due to a hung thread. Otherwise, any other decision processing is made (block 418).

The above-described embodiments of disclosure are intended to be examples only. Alterations, modifications, and variations may be effected to particular embodiments by those of skill in art without departing from scope of disclosure, which is defined solely by claims appended hereto.

What is claimed is:

1. A method for optimizing enterprise server resources in a computer system, the method executing on a host computer of the computer system and comprising:
   monitoring at least one metric of the computer system capable of indicating a performance level thereof;
   determining whether the performance level needs to be improved; and
   responsive to a determination that the performance level needs to be improved, selecting and implementing a best method to improve the performance level by adaptively manipulating one or more threads in a pool of threads in the computer system, wherein the best method comprises when a faulty network connection is increasing latency for a first set of users, creating a new thread pool and assigning the first set of users to that pool to isolate the first set of users from other users, when latency is increased for most users, increasing the number of threads and when poor system performance is due to fail over of a mail file and a resulting longer-than-expected access time to native databases, assigning threads to respective users, the assignment being permanent until the computer system is shut down or an error condition occurs.

2. The method of claim 1 wherein the monitoring at least one metric includes checking CPU utilization of all threads of the computer system.

3. The method of claim 1 wherein the monitoring at least one metric includes checking a latency of mail processing.

4. The method of claim 1 wherein the monitoring at least one metric comprises checking responsiveness of all threads.

5. The method of claim 1 wherein the determining comprises:
   generating at least one statistical parameter for each of the at least one metric; and
   examining the generated at least one statistical parameter for each of the at least one metric.

6. The method of claim 5 wherein the at least one statistical parameter is selected from at least one of a statistical average, a mean, a highest use, and a standard deviation.

7. A system for optimizing enterprise server resources in a host computer, the system comprising:
   a processor and memory;
   means, operating on the host computer, for monitoring at least one metric of the computer capable of indicating a performance level thereof;
   means, operating on the host computer, for determining whether the performance level needs to be improved; and
   means, operating on the host computer, responsive to a determination that the performance level needs to be improved, for selecting and implementing a best method to improve the performance level by adaptively manipulating one or more threads in a pool of threads in the computer system, wherein the means for implementing the best method comprises means, operable when a faulty network connection is increasing latency for a first set of users, for creating a new thread pool and assigning the first set of users to that pool to isolate the first set of users from other users, means, operable when latency is increased for most users, for increasing the number of threads and means, operable when poor system performance is due to fail over of a mail file and results in longer-than-expected access time to native databases, for assigning threads to respective users, the assignment being permanent until the computer system is shut down or an error condition occurs.

8. The system of claim 7 wherein the means for monitoring at least one metric includes checking CPU utilization of all threads of the computer.

9. The system of claim 7 wherein the means for monitoring at least one metric includes checking a latency of mail processing.

10. The system of claim 7 wherein the means for monitoring at least one metric comprises checking responsiveness of all threads.

11. The system of claim 7 wherein the means for determining comprises:
    means for generating at least one statistical parameter for each of the at least one metric; and
    means for examining the generated at least one statistical parameter for each of the at least one metric.

12. The system of claim 11 wherein the at least one statistical parameter is selected from the at least one of a statistical average, a mean, a highest use, and a standard deviation.

13. A computer system comprising:
    a host computer;
    redirector software executable on the host computer, the redirector software for redirecting data items of a user to the user's mobile data communications device ("MDCD"); and
    a resource optimizing module executable on the host computer that is operable to monitor at least one metric of the computer system capable of indicating a performance level thereof, to determine whether the performance level needs to be improved, and responsive to a determination that the performance level needs to be improved, to implement a best method to improve the performance level by adaptively manipulating one or more threads in a pool of threads in the computer system, wherein when mail deliver latency is increased for a first set of users but not all users, the resource optimizing module is operable to create a new thread pool and assign the first set of users to that pool to isolate the first set of users from other users, when mail delivery latency is increased for most users, the resource optimizing module is operable to increase the number of threads and when poor system performance is due to fail over of a mail file and a resulting longer-than-expected access time to native databases, the resource optimizing module is operable to assign threads to respective users, the assignment being permanent until the computer system is shut down or an error condition occurs.

14. The computer system of claim 13 wherein the at least one metric is selected from at least one of CPU utilization of all threads of the computer system, mail processing latency, and responsiveness of all threads.

15. The computer system of claim 13 wherein the resource-optimizing module is implemented in hardware.

16. The computer system of claim 13 wherein the resource-optimizing module is implemented in software.

17. The computer system of claim 13 wherein the resource-optimizing module is implemented in a combination of hardware and software.

* * * * *